United States Patent
Hamabe et al.

(10) Patent No.: US 12,139,163 B2
(45) Date of Patent: *Nov. 12, 2024

(54) VEHICULAR DISPLAY CONTROL DEVICE, VEHICULAR DISPLAY DEVICE, VEHICLE, VEHICULAR DISPLAY CONTROL METHOD, AND NON-TRANSITORY RECORDING MEDIUM

(71) Applicant: TOYOTA JIDOSHA KABUSHIKI KAISHA, Toyota (JP)

(72) Inventors: Ryota Hamabe, Nisshin (JP); Keigo Hori, Toyota (JP); Takahiro Hirota, Nukata-gun (JP); Yoshinori Murata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/380,762

(22) Filed: Oct. 17, 2023

(65) Prior Publication Data

US 2024/0043030 A1 Feb. 8, 2024

Related U.S. Application Data

(63) Continuation of application No. 17/879,532, filed on Aug. 2, 2022, now Pat. No. 11,820,396.

(30) Foreign Application Priority Data

Sep. 24, 2021 (JP) .................................. 2021-156126

(51) Int. Cl.
*B60W 50/14* (2020.01)
*B60K 35/00* (2024.01)
(Continued)

(52) U.S. Cl.
CPC ............. *B60W 50/14* (2013.01); *B60K 35/00* (2013.01); *B60W 40/04* (2013.01); *B60K 35/28* (2024.01);
(Continued)

(58) Field of Classification Search
CPC ................ B60W 50/14; B60W 40/04; B60W 2554/4045; B60W 2554/4046;
(Continued)

(56) References Cited

U.S. PATENT DOCUMENTS 10,902,726 B2 * 1/2021 Alvarez ................. G08G 1/162
11,378,978 B2 * 7/2022 Cui ......................... G08G 1/167
(Continued)

FOREIGN PATENT DOCUMENTS

JP   2004-058918 A   2/2004
JP   2017-041126 A   2/2017
(Continued)

OTHER PUBLICATIONS

Aug. 7, 2023 Notice of Allowance issued in U.S. Appl. No. 17/879,532.

*Primary Examiner* — Chico A Foxx
(74) *Attorney, Agent, or Firm* — Oliff PLC

(57) ABSTRACT

In cases in which an other vehicle traveling along an adjacent lane, which is adjacent to a travel lane of a host vehicle is executing a cut-in operation to move from the adjacent lane to a cut-in position ahead of the host vehicle in the travel lane, a processor controls a display section configured to display a travel lane image representing the travel lane, an adjacent lane image representing the adjacent lane, a lane boundary line image representing a lane boundary line defining a boundary between the travel lane and the adjacent lane, and an other vehicle image representing the other vehicle, such that the display section causes the other (Continued)

vehicle image to move in a discontinuous manner from a first position on the adjacent lane image to a second position on the lane boundary line image.

7 Claims, 8 Drawing Sheets

(51) Int. Cl.
*B60W 40/04* (2006.01)
*B60K 35/28* (2024.01)
*B60K 35/29* (2024.01)
*B60K 35/81* (2024.01)

(52) U.S. Cl.
CPC .............. *B60K 35/29* (2024.01); *B60K 35/81* (2024.01); *B60K 2360/1868* (2024.01); *B60K 2360/188* (2024.01); *B60W 2050/146* (2013.01); *B60W 2554/4045* (2020.02); *B60W 2554/4046* (2020.02)

(58) Field of Classification Search
CPC . B60W 2050/146; B60K 35/00; B60K 35/81; B60K 35/28; B60K 2360/1868; B60K 35/29; B60K 2360/188
See application file for complete search history.

(56) References Cited

U.S. PATENT DOCUMENTS

| | | |
|---|---|---|
| 2004/0085197 A1 | 5/2004 | Watanabe et al. |
| 2005/0240342 A1* | 10/2005 | Ishihara ................. G08G 1/167 |
| | | 701/1 |
| 2012/0062745 A1* | 3/2012 | Han ....................... B60W 30/12 |
| | | 348/148 |
| 2012/0072097 A1* | 3/2012 | Ohta ....................... G08G 1/167 |
| | | 701/1 |
| 2012/0130561 A1* | 5/2012 | Chiang .................. G08G 1/165 |
| | | 701/1 |
| 2015/0314783 A1 | 11/2015 | Nespolo et al. |
| 2017/0240109 A1 | 8/2017 | Kimura |
| 2018/0023970 A1 | 1/2018 | Iguchi |
| 2018/0058879 A1* | 3/2018 | Tayama ............. B60W 60/0011 |
| 2020/0111359 A1* | 4/2020 | Yim .................. G08G 1/09623 |
| 2020/0231178 A1 | 7/2020 | Murayama et al. |
| 2021/0150904 A1* | 5/2021 | Nagata .................. G08G 1/164 |
| 2021/0155159 A1* | 5/2021 | Kawate .................. B60K 35/00 |
| 2021/0343148 A1 | 11/2021 | Lee |
| 2021/0387634 A1 | 12/2021 | Luna Arriaga |
| 2022/0009488 A1* | 1/2022 | Li .......................... B60W 40/04 |
| 2022/0105929 A1 | 4/2022 | Takei et al. |
| 2022/0108602 A1 | 4/2022 | Kathuria |
| 2022/0118983 A1* | 4/2022 | Yagyu .................. B62D 15/025 |
| 2022/0242435 A1* | 8/2022 | Mihara ................ B60K 35/215 |
| 2023/0076404 A1 | 3/2023 | Fuwa |
| 2023/0182572 A1 | 6/2023 | Fujino et al. |
| 2023/0191911 A1 | 6/2023 | Izumi et al. |

FOREIGN PATENT DOCUMENTS

| | | |
|---|---|---|
| JP | 2017-151637 A | 8/2017 |
| JP | 2019-199139 A | 11/2019 |
| JP | 2021-037895 A | 3/2021 |
| WO | 2019/225265 A1 | 11/2019 |
| WO | 2021/166744 A1 | 8/2021 |

* cited by examiner

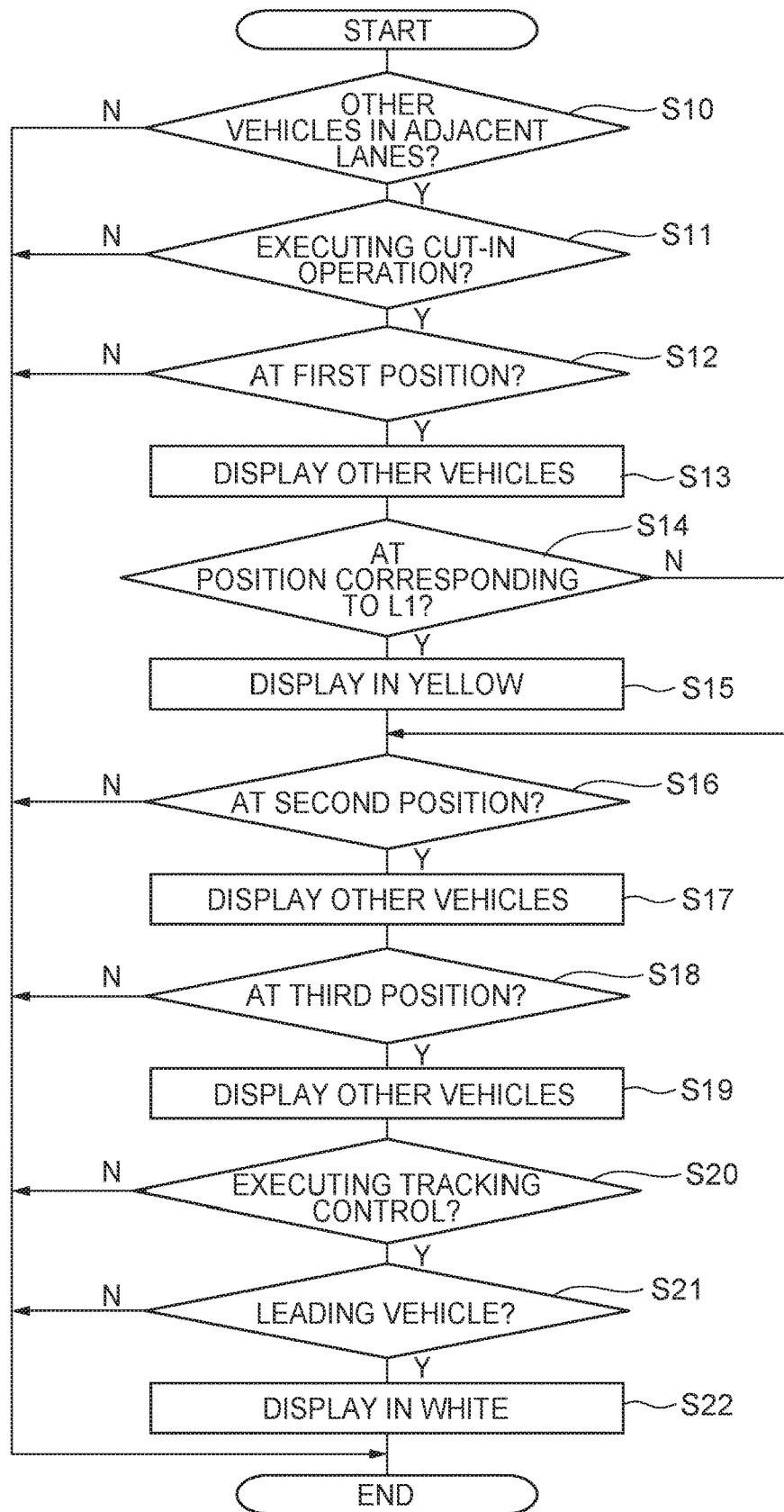

VEHICULAR DISPLAY CONTROL DEVICE, VEHICULAR DISPLAY DEVICE, VEHICLE, VEHICULAR DISPLAY CONTROL METHOD, AND NON-TRANSITORY RECORDING MEDIUM

CROSS-REFERENCE TO RELATED APPLICATION

This application is a Continuation of application Ser. No. 17/879,532, filed Aug. 2, 2022, which claims priority under 35 USC 119 from Japanese Patent Application No. 2021-156126, filed on Sep. 24, 2021. The contents of the prior applications are hereby incorporated by reference in their entirety.

BACKGROUND

Technical Field

The present disclosure relates to a vehicular display control device, a vehicular display device, a vehicle, a vehicular display control method, and a non-transitory recording medium.

Related Art

Japanese Patent Application Laid-Open (JP-A) No. 2021-37895 discloses an invention in which, in cases in which another vehicle traveling along an adjacent lane adjacent to a travel lane along which a vehicle is traveling might cut into this travel lane, an envisaged travel trajectory of this other vehicle is displayed on a head-up display.

There is room for improvement in the invention of JP-A No. 2021-37895 regarding making it easier for a driver to identify the cut-in operation that the other vehicle traveling along the adjacent lane is executing.

In consideration of the above circumstances, an object of the present disclosure is to obtain a vehicular display control device, a vehicular display device, a vehicle, a vehicular display control method, and a non-transitory recording medium that make it easier for a driver to identify a cut-in operation that another vehicle traveling along an adjacent lane is executing.

SUMMARY

A vehicular display control device according to a first aspect of the present disclosure includes a processor. In cases in which an other vehicle traveling along an adjacent lane, which is adjacent to a travel lane that is a lane of travel of an host vehicle is executing a cut-in operation to move from the adjacent lane to a cut-in position ahead of the host vehicle on the travel lane, the processor is configured to control a display section configured to display a travel lane image representing the travel lane, an adjacent lane image representing the adjacent lane, a lane boundary line image representing a lane boundary line defining a boundary between the travel lane and the adjacent lane, and an other vehicle image representing the other vehicle, such that the display section causes the other vehicle image to move in a discontinuous manner from a first position on the adjacent lane image to a second position on the lane boundary line image.

In the vehicular display control device according to the first aspect of the present disclosure, in cases in which the other vehicle traveling along the adjacent lane adjacent to the travel lane of the host vehicle is executing a cut-in operation to move from the adjacent lane to a cut-in position on the travel lane, the display section under the control of the processor performs display such that the other vehicle image representing the other vehicle is moved in a discontinuous manner from the first position on the adjacent lane image representing the adjacent lane to the second position on the lane boundary line image representing the lane boundary line defining the boundary between the travel lane and the adjacent lane. It is therefore easy for a driver viewing the other vehicle image to identify that the other vehicle traveling along the adjacent lane is executing a cut-in operation. Namely, it is easier for the driver viewing the other vehicle image to identify that the other vehicle traveling along the adjacent lane is executing a cut-in operation than for example cases in which the other vehicle image is displayed so as to move in a continuous manner from the first position to the second position.

A vehicular display control device according to a second aspect of the present disclosure is the first aspect of the present disclosure, wherein the processor is configured to control the display section when the other vehicle is executing the cut-in operation such that the other vehicle image moves in a discontinuous manner from the second position to a third position corresponding to the cut-in position on the travel lane image.

In the second aspect of the present disclosure, the display section performs display under the control of the processor when the other vehicle is executing the cut-in operation, such that the other vehicle image moves in a discontinuous manner from the second position to the third position corresponding to the cut-in position on the travel lane image. It is therefore easy for the driver viewing the other vehicle image to identify that the other vehicle is executing a cut-in operation. Namely, it is easier for the driver viewing the other vehicle image to identify that the other vehicle is executing a cut-in operation than for example cases in which the other vehicle image is displayed so as to move in a continuous manner from the second position to the third position.

A vehicular display control device according to a third aspect of the present disclosure is the first aspect of the present disclosure, wherein the processor is configured to cause the display section to display the other vehicle image in cases in which a determination is made that the other vehicle might execute the cut-in operation based on behavior of the other vehicle traveling along the adjacent lane.

In the third aspect of the present disclosure, the processor causes the display section to display the other vehicle image in cases in which a determination is made that the other vehicle might execute the cut-in operation based on the behavior of the other vehicle traveling along the adjacent lane. Since only the other vehicle image corresponding to the other vehicle that the processor has determined might execute the cut-in operation is displayed on the display section, this is less likely to annoy the driver than cases in which other vehicle images representing all the other vehicles traveling along the adjacent lane are displayed on the display section.

A vehicular display control device according to a fourth aspect of the present disclosure is the first aspect of the present disclosure, wherein the processor is configured to control the display section so as to display the other vehicle image representing the other vehicle located on the adjacent lane and ahead of the host vehicle at one of a plurality of positions arranged in a row along a front-rear direction on the adjacent lane image.

In the fourth aspect of the present disclosure, the other vehicle image representing the other vehicle located on the adjacent lane and ahead of the host vehicle is displayed at one of a plurality of positions arranged in a row along the front-rear direction on the adjacent lane image. The driver viewing the other vehicle image is therefore able to identify the front-rear direction position of the other vehicle image representing the other vehicle that might execute the cut-in operation.

A vehicular display control device according to a fifth aspect of the present disclosure is the fourth aspect of the present disclosure, wherein in a case in which the other vehicle image is located at a specific position rearward of a predetermined position among the plural positions and is located at least at one of the first position or the second position, the processor is configured to control the display section such that the other vehicle image located at the specific position is displayed in a different format than in cases in which the other vehicle image is located at a different position from the specific position.

In the fifth aspect of the present disclosure, in a case in which the other vehicle image is located at the specific position rearward of the predetermined position among the plural positions and is located at least at one position out of the first position or the second position, the other vehicle image located at the specific position is displayed in a different format from in a case in which the other vehicle image is located at a different position from the specific position. In such cases, there is only a short front-rear direction distance between the other vehicle corresponding to the other vehicle image and the host vehicle, and so sufficient attention needs to be paid to the cut-in operation by this other vehicle. Since the other vehicle image corresponding to the other vehicle is displayed in such a format, the driver viewing the other vehicle image is able to pay sufficient attention to this cut-in operation by the other vehicle.

A vehicular display control device according to a sixth aspect of the present disclosure is the first aspect of the present disclosure, wherein in cases in which a determination is made that the other vehicle moving from the adjacent lane to the travel lane is a preceding vehicle from the perspective of the host vehicle while executing tracking control, the processor is configured to control the display section such that the other vehicle image representing the other vehicle determined to be the preceding vehicle is displayed in a different format from the other vehicle image in cases in which the other vehicle has not been determined to be the preceding vehicle.

In the sixth aspect of the present disclosure, in cases in which the processor has determined that the other vehicle moving from the adjacent lane to the travel lane is the preceding vehicle from the perspective of the host vehicle while executing tracking control, the display section displays the other vehicle image representing the other vehicle determined to be the preceding vehicle in a different format from the other vehicle image in cases in which the other vehicle has not been determined to be the preceding vehicle. The driver viewing the other vehicle image is thereby able to identify whether or not the other vehicle corresponding to the other vehicle image is the preceding vehicle from the perspective of the host vehicle.

A vehicular display device according to a seventh aspect of the present disclosure includes a display section, and the vehicular display control device of the first aspect to the sixth aspect of the present disclosure.

A vehicle according to an eighth aspect of the present disclosure includes the vehicular display device according to the seventh aspect of the present disclosure.

In a vehicular display control method according to a ninth aspect of the present disclosure, in a case in which an other vehicle traveling along an adjacent lane, which is adjacent to a travel lane of a host vehicle is executing a cut-in operation to move from the adjacent lane to a cut-in position ahead of the host vehicle on the travel lane, a processor is configured to control a display section configured to display a travel lane image representing the travel lane, an adjacent lane image representing the adjacent lane, a lane boundary line image representing a lane boundary line defining a boundary between the travel lane and the adjacent lane, and an other vehicle image representing the other vehicle, such that the display section causes the other vehicle image to move in a discontinuous manner from a first position on the adjacent lane image to a second position on the lane boundary line image.

A non-transitory recording medium storing a program that is executable by a computer to execute processing, the processing including, in a case in which an other vehicle traveling along an adjacent lane, which is adjacent to a travel lane of an host vehicle is executing a cut-in operation to move from the adjacent lane to a cut-in position ahead of the host vehicle on the travel lane, controlling a display section capable of displaying a travel lane image representing the travel lane, an adjacent lane image representing the adjacent lane, a lane boundary line image representing a lane boundary line defining a boundary between the travel lane and the adjacent lane, and an other vehicle image representing the other vehicle, such that the display section causes the other vehicle image to move in a discontinuous manner from a first position on the adjacent lane image to a second position on the lane boundary line image.

As described above, the vehicular display control device, the vehicular display device, the vehicle, the vehicular display control method, and the non-transitory recording medium according to the present disclosure exhibit an excellent advantageous effect of making it easier for the driver to identify the cut-in operation that the other vehicle traveling along the adjacent lane is executing.

BRIEF DESCRIPTION OF THE DRAWINGS

Exemplary embodiments of the present invention will be described in detail based on the following figures, wherein:

FIG. 8 is a flowchart illustrating processing executed by the display control ECU of the vehicle.

DETAILED DESCRIPTION

Explanation follows regarding an exemplary embodiment of a vehicular display control device, a vehicular display device, a vehicle 10, a vehicular display control method, and a non-transitory recording medium according to the present disclosure, with reference to the drawings.

Figure 1:
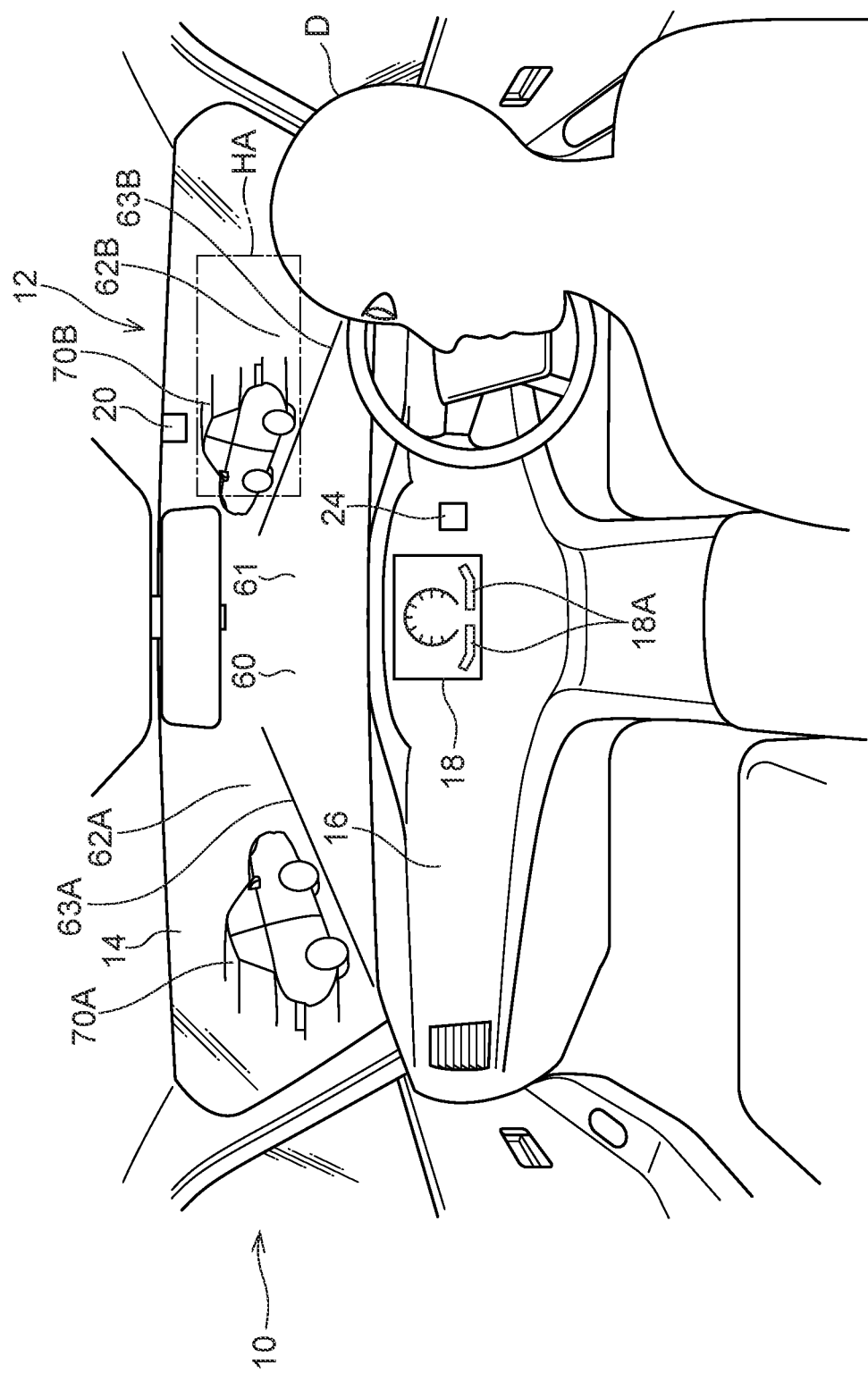
FIG. 1 is a diagram illustrating an interior of a vehicle equipped with a vehicular display control device according to an exemplary embodiment.

As illustrated in FIG. 1, the vehicle (host vehicle) 10 of the present exemplary embodiment is equipped with a front windshield 14 and an instrument panel 16. A display (display section; vehicular display device) 18 and a driving assistance switch 24 are provided on the instrument panel 16. A sensor group 20 is provided at an upper portion of a vehicle inside face of the front windshield 14. The sensor group 20 includes at least one out of a camera, a laser imaging detection and ranging (LIDAR) sensor, a locator camera, or a millimeter-wave radar sensor. The driving assistance switch 24 is a switch for causing the vehicle 10 to execute driving assistance control, described later.

Figure 2:
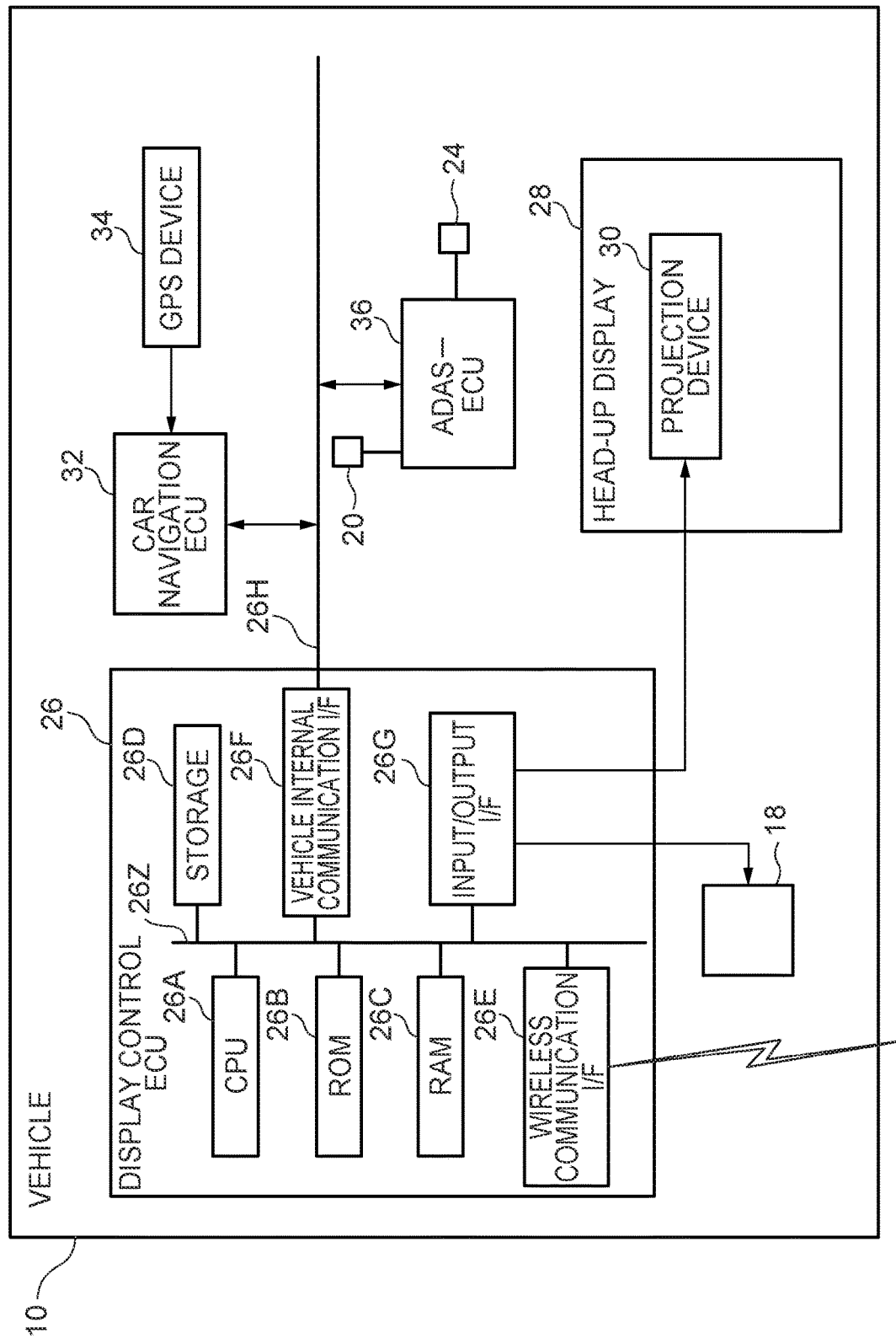
FIG. 2 is a diagram illustrating a hardware configuration of the vehicle illustrated in FIG. 1.

As illustrated in FIG. 2, in addition to the display 18, the sensor group 20, and the driving assistance switch 24, the vehicle 10 includes as hardware configuration a display control ECU (vehicular display control device) 26, a head-up display (hereafter HUD; display section; vehicular display device) 28, a car navigation ECU 32, a GPS device 34, and an ADAS-ECU 36.

The display control ECU 26 is configured including a central processing unit (CPU; processor) 26A, read only memory (ROM; non-transitory recording medium) 26B, random access memory (RAM) 26C, storage (non-transitory recording medium) 26D, a wireless communication interface (I/F) 26E, a vehicle internal communication I/F 26F, and an input/output I/F 26G. The CPU 26A, the ROM 26B, the RAM 26C, the storage 26D, the wireless communication I/F 26E, the vehicle internal communication I/F 26F, and the input/output I/F 26G are connected so as to be capable of communicating with one another through an internal bus 26Z.

The CPU 26A is a central processing unit that executes various programs and controls respective sections. The CPU 26A reads programs from the ROM 26B or the storage 26D and executes the programs using the RAM 26C as workspace. The CPU 26A controls the respective configuration elements and performs various arithmetical processing according to the programs recorded in the ROM 26B or the storage 26D.

The ROM 26B holds various programs and various data. The RAM 26C serves as workspace that temporarily stores programs or data. The storage 26D is configured by a storage device such as a hard disk drive (HDD) or a solid state drive (SSD), and holds various programs and various data.

The wireless communication I/F 26E is an interface for performing wireless communication with various equipment. For example, the wireless communication I/F 26E is capable of performing wireless communication with wireless communication equipment of other vehicles 70A, 70B, described later. The wireless communication I/F 26E employs a communication standard such as Bluetooth (registered trademark) and Wi-Fi (registered trademark).

The vehicle internal communication I/F 26F is an interface for connecting to the car navigation ECU 32 and the ADAS-ECU 36 through an external bus 26H. This interface for example employs a communication standard using a CAN protocol.

The input/output I/F 26G is an interface for performing communication between the display 18 and the HUD 28.

Figure 3:
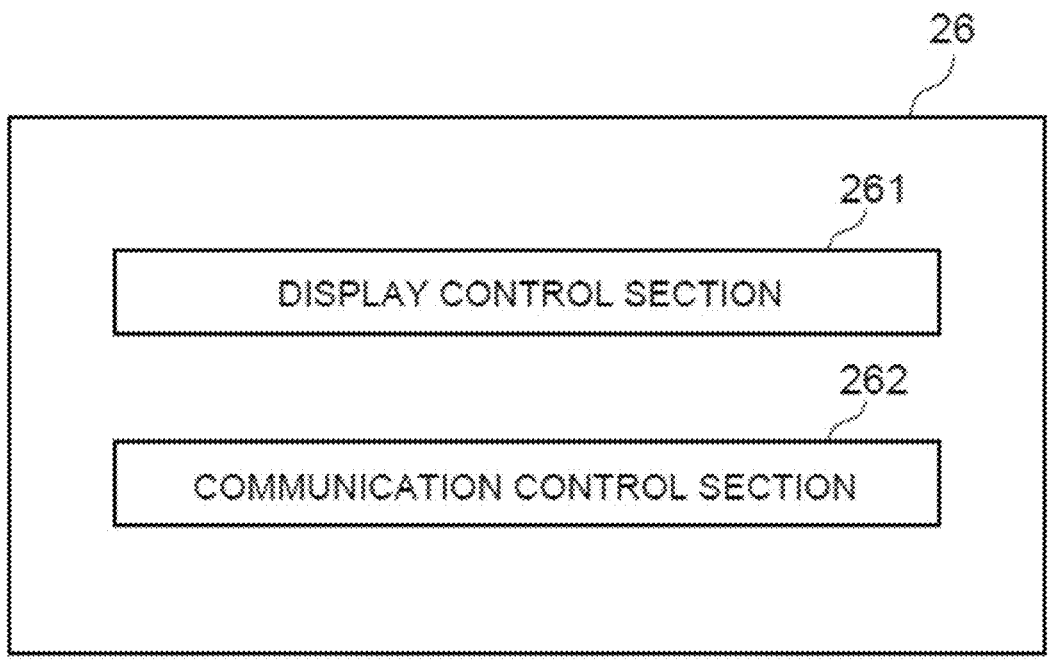
FIG. 3 is a functional block diagram of a display control ECU of the vehicle.

FIG. 3 is a block diagram illustrating an example of functional configuration of the display control ECU 26. The display control ECU 26 includes a display control section 261 and a communication control section 262 as functional configuration. The display control section 261 and the communication control section 262 are implemented by the CPU 26A reading and executing a program stored in the ROM 26B.

The display control section 261 controls the display 18 and the HUD 28, as described later.

The communication control section 262 controls the wireless communication I/F 26E and the vehicle internal communication I/F 26F.

The HUD 28 includes a projection device 30. Images projected from the projection device 30 are reflected toward the front using a mirror (not illustrated in the drawings), such that various images are displayed on a display region HA (see FIG. 1) formed on the front windshield 14.

Both the car navigation ECU 32 and the ADAS-ECU 36 are configured including a CPU (processor), ROM, RAM, storage, a wireless communication I/F, a vehicle internal communication I/F, and an input/output I/F. The CPU, the ROM, the RAM, the storage, the wireless communication I/F, the vehicle internal communication I/F, and the input/output I/F are connected so as to be capable of communicating with one another through an internal bus.

The car navigation ECU 32 controls a car navigation system. Map data is recorded in the ROM or storage of the car navigation ECU 32. The GPS device 34 is connected to the car navigation ECU 32. The GPS device 34 includes a GPS antenna (not illustrated in the drawings) that receives signals from GPS satellites.

The sensor group 20 and the driving assistance switch 24 are connected to the ADAS-ECU 36. The ADAS-ECU 36 is also connected to various actuators for driving a brake device, a steering device, and an internal combustion engine (drive source). The ADAS-ECU 36 may also be connected to an electric motor (drive source).

Figure 4:
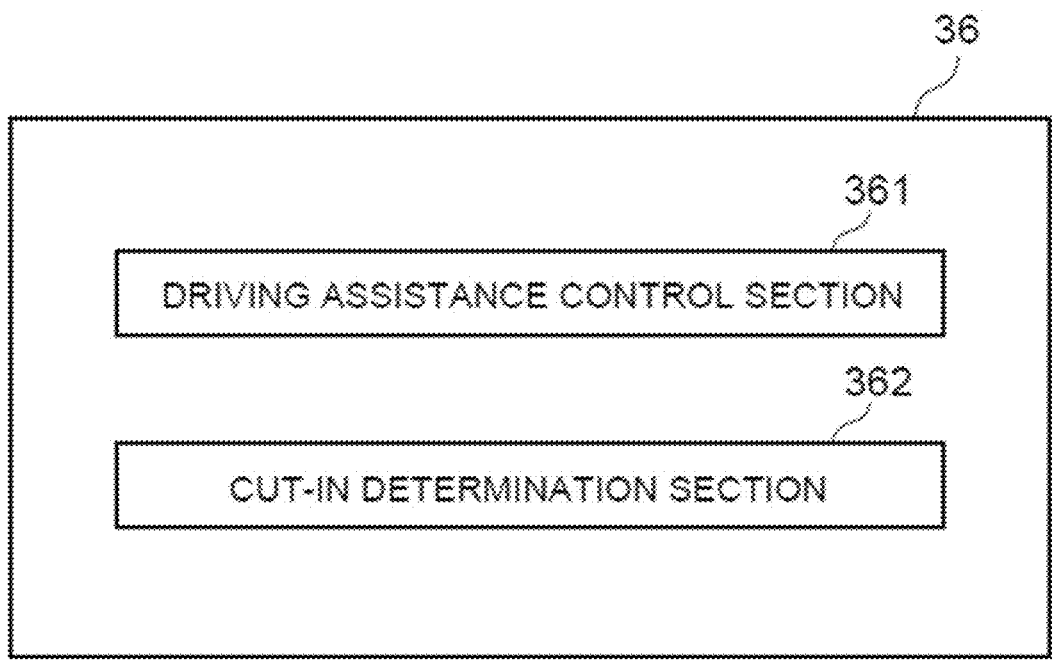
FIG. 4 is a functional block diagram of an ADAS-ECU of the vehicle.

FIG. 4 is a block diagram illustrating an example of the ADAS-ECU 36. The ADAS-ECU 36 includes a driving assistance control section 361 and a cut-in determination section 362 as functional configuration. The driving assistance control section 361 and the cut-in determination section 362 are implemented by the CPU reading and executing a program stored in the ROM.

The driving assistance control section 361 includes functionality to execute driving assistance control of the vehicle 10 by controlling the above-mentioned actuator group (and the electric motor). In the present specification, "driving assistance control" includes the driving assistance control of level 1 to level 5 automation in the driving automation scale as defined by the Society of Automotive Engineers (SAE). The driving assistance control includes, for example, adaptive cruise control (ACC) and cooperative adaptive cruise control (CACC). An initial state of the driving assistance switch 24 is an OFF state. The vehicle 10 is able to execute driving assistance control when the driving assistance switch 24 has been set to an ON state. An occupant can cause the vehicle 10 to execute driving assistance control at a desired level out of the level 1 to level 5 automation in the driving automation scale by operating the driving assistance switch 24 when in the ON state.

The driving assistance control section 361 also determines whether or not a vehicle traveling ahead of the vehicle 10 corresponds to a preceding vehicle while executing tracking control (ACC or CACC). When the driving assistance control section 361 has caused the brake device to operate automatically while executing tracking control, as illustrated in FIG. 1, the display 18 displays an image 18A indicating this brake operation.

The cut-in determination section 362 includes functionality to determine whether or not any other vehicles 70A, 70B are present in any lane included in a road 60 (see FIG. 1) along which the vehicle 10 is traveling, based on information acquired by the sensor group 20. The cut-in determination section 362 also computes a lane width direction position and a lane extension direction position of each other vehicle 70A, 70B based on the information acquired by the sensor group 20.

The cut-in determination section 362 also includes functionality to determine whether or not either of the other vehicles 70A, 70B (see FIG. 1) traveling along adjacent lanes 62A, 62B (see FIG. 1) adjacent to a travel lane 61 along which the vehicle 10 is traveling (see FIG. 1) might execute a cut-in operation in which the other vehicle 70A, 70B moves to a cut-in position that is a region of the travel lane 61 ahead of the vehicle 10, and whether or not the other vehicle 70A, 70B is executing such a cut-in operation, based on the information acquired by the sensor group 20. Note that the cut-in determination section 362 may perform this determination based on determination logic disclosed in JP-A No. 2021-37895.

The ADAS-ECU 36 transmits information relating to driving assistance control selected using the driving assistance switch 24 to the display control ECU 26.

Figure 5:
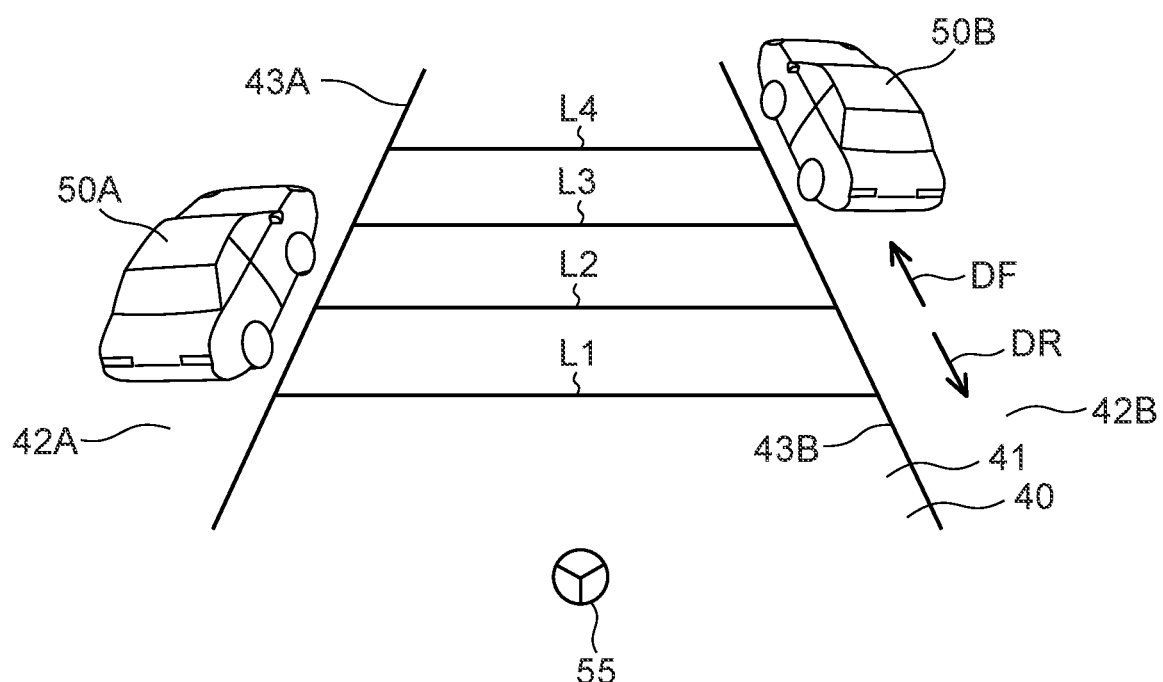
FIG. 5 is a schematic diagram illustrating an image formed on a display and a display region.
Figure 6:
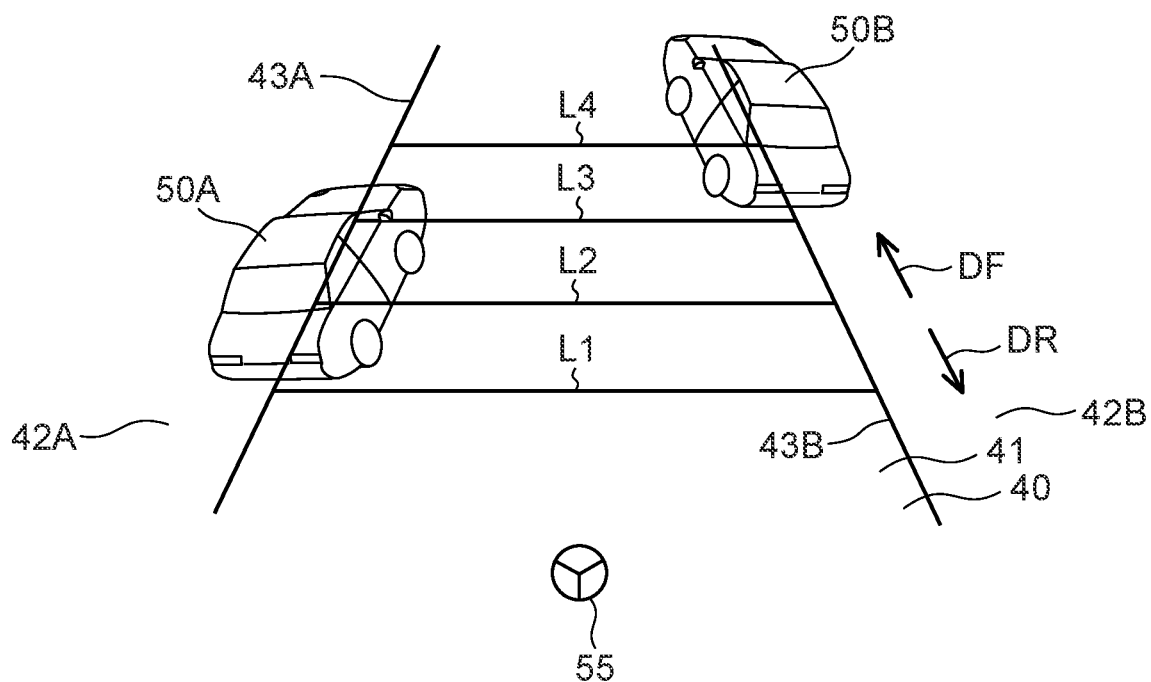
FIG. 6 is a similar schematic diagram to FIG. 5, illustrating a state when other vehicles have moved to second positions.
Figure 7:
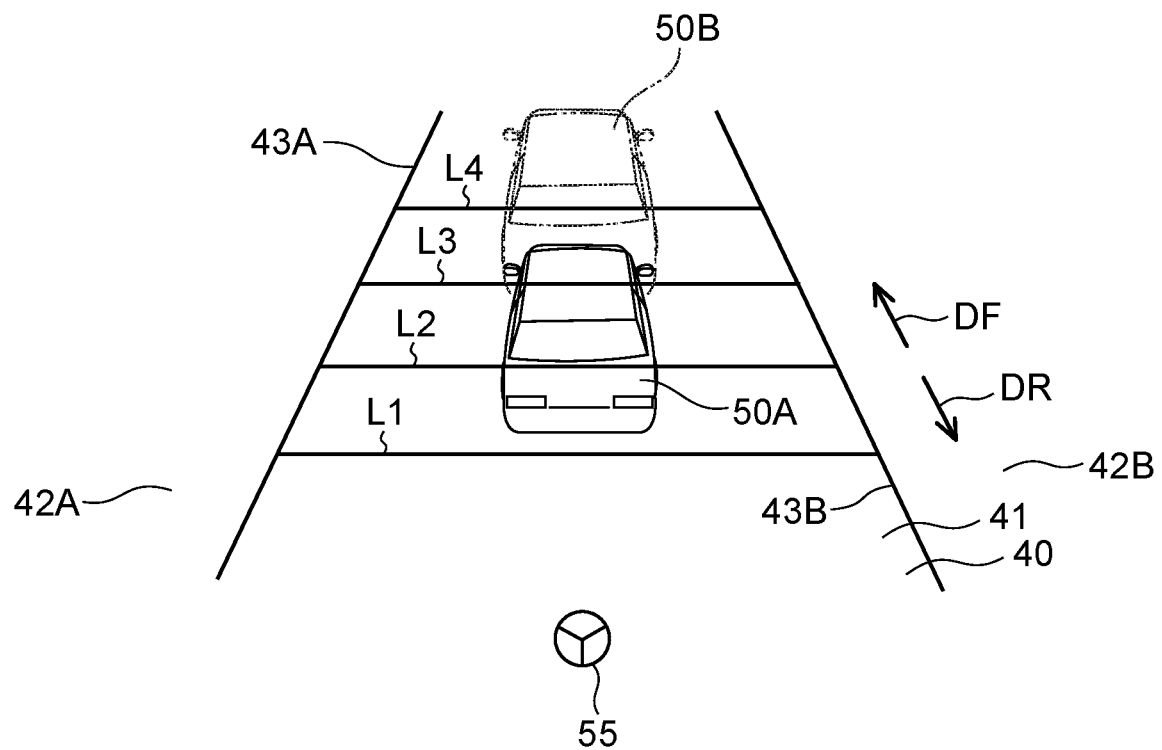
FIG. 7 is a similar schematic diagram to FIG. 5, illustrating a state when other vehicles have moved to a third position.

Next, explanation follows regarding an image displayed on the display 18 and the display region HA, with reference to FIG. 5 to FIG. 7. Note that the image illustrated in FIG. 5 to FIG. 7 is an image that schematically represents a scene that is visually identifiable by a driver D (see FIG. 1) of the vehicle 10. Note that for convenience, the scene (image) depicts an image viewed from a higher position than the eyes of the driver D.

A road image 40 illustrated in FIG. 5 to FIG. 7 is displayed on the display 18 and the display region HA. In FIG. 5 to FIG. 7, the arrow DR indicates rearward of the vehicle 10, and the arrow DF indicates ahead of the vehicle 10 (the direction of progress). The road image 40 is an image that is based on the map data recorded in the storage of the car navigation ECU 32. For example, as illustrated in FIG. 1, in cases in which the road 60 along which the vehicle 10 is currently traveling includes the travel lane 61 and the two adjacent lanes 62A, 62B adjacent to the travel lane 61, the road image 40 includes a travel lane image 41 and two adjacent lane images 42A, 42B. The travel lane image 41 is an image corresponding to the travel lane 61, the adjacent lane image 42A is an image corresponding to the adjacent lane 62A, and the adjacent lane image 42B is an image corresponding to the adjacent lane 62B.

For example, in cases in which the display control section 261 of the display control ECU 26 has identified that the vehicle 10 is traveling along the travel lane 61 based on information acquired from the car navigation ECU 32 (GPS device 34), the display control section 261 controls the display 18 and the HUD 28 such that an host vehicle image 55 is displayed on the travel lane image 41. The travel lane image 41 includes a first line L1, a second line L2, a third line L3, and a fourth line L4 that are located ahead of the host vehicle image 55. The first line L1, the second line L2, the third line L3, and the fourth line L4 all represent positions ahead of the vehicle 10 (host vehicle image 55). A distance from the vehicle 10 to the second line L2 is longer than a distance from the vehicle 10 to the first line L1, a distance from the vehicle 10 to the third line L3 is longer than a distance from the vehicle 10 to the second line L2, and a distance from the vehicle 10 to the fourth line L4 is longer than a distance from the vehicle 10 to the third line L3.

For example, in cases in which the cut-in determination section 362 has determined that the other vehicle 70A is traveling along the adjacent lane 62A and the other vehicle 70B is traveling along the adjacent lane 62B based on the information acquired by the sensor group 20, this determination result is transmitted from the ADAS-ECU 36 to the display control ECU 26. The display control section 261 of the display control ECU 26 therefore controls the display 18 and the HUD 28 such that other vehicle images 50A, 50B corresponding to the other vehicles 70A, 70B are displayed overlaid on the corresponding adjacent lane images 42A, 42B on the display 18 and the display region HA. Furthermore, the cut-in determination section 362 computes a distance between the vehicle 10 and each of the other vehicles 70A, 70B based on the information acquired from the sensor group 20 and position information acquired by the GPS device 34. This distance-related information is transmitted from the ADAS-ECU 36 to the display control ECU 26. On receiving this distance-related information, the display control section 261 of the display control ECU 26 adjusts the position of the other vehicle image 50A on the adjacent lane image 42A and the position of the other vehicle image 50B on the adjacent lane image 42B. For example, in cases in which a distance from the vehicle 10 to the other vehicle 70A is a predetermined short distance, the other vehicle image 50A is displayed such that a front-rear position of its rear end is at the same position as the first line L1 as illustrated in FIG. 5. In cases in which a distance from the vehicle 10 to the other vehicle 70B is a predetermined long distance, the other vehicle image 50B is displayed such that a front-rear position of its rear end is at the same position as the third line L3 as illustrated in FIG. 5.

Operation and Advantageous Effects

Next, description follows regarding operation and advantageous effects of the present exemplary embodiment.

Explanation follows regarding processing executed by the display control ECU 26 of the vehicle 10, with reference to the flowchart in FIG. 8. The display control ECU 26 executes the processing of the flowchart illustrated in FIG. 8 each time a predetermined duration has elapsed.

At step S10, the display control section 261 of the display control ECU 26 determines whether or not any other vehicles 70A, 70B are traveling in adjacent lanes 62A, 62B based on information received from the ADAS-ECU 36.

In this example, a YES determination is made at step S10. The display control ECU 26 therefore proceeds to step S11 and determines whether or not either of the other vehicles 70B is executing a cut-in operation based on the information received from the ADAS-ECU 36.

In this example, a YES determination is made at step S11. The display control ECU 26 therefore proceeds to step S12, and determines whether or not either of the other vehicles 70B is located at a first position based on the information received from the ADAS-ECU 36. The first position corresponds to a lane width direction position of the other vehicle 70A, 70B when a vehicle width direction central point of the other vehicle 70A, 70B overlaps a lane width direction central position of the corresponding adjacent lane 62A, 62B in plan view. A lane width direction dimension of the central part of each of the adjacent lanes 62A, 62B has a certain length. Namely, the first position is not just one specific point. In cases in which either of the other vehicles 70A, 70B is located at the corresponding first position, this other vehicle 70A, 70B is spaced apart from a corresponding lane boundary line 63A, 63B.

In this example, a determination is made that the other vehicles 70A, 70B are located at the respective first positions on the adjacent lanes 62A, 62B. The display control ECU 26 therefore proceeds to step S13, and the display control section 261 displays the other vehicle images 50A, 50B overlaid on the corresponding adjacent lane images 42A, 42B as illustrated in FIG. 5. The other vehicle image 50A is spaced apart from a lane boundary line image 43A, and the other vehicle image 50B is spaced apart from a lane boundary line image 43B at this time.

Furthermore, as illustrated for example in FIG. 5, the other vehicle images 50A, 50B are displayed such that the front-rear position of the rear end of the other vehicle image 50A is located at the same position as the first line L1, and the front-rear position of the rear end of the other vehicle image 50B is located at the same position as the third line L3 at this time.

On finishing the processing of step S13, the display control ECU 26 proceeds to step S14 and determines whether or not the rear end of either of the other vehicles 70A, 70B is located at a position (specific position) corresponding to the first line L1 that is behind a position (predetermined position) corresponding to the second line L2.

In this example, a YES determination is made at step S14. The display control ECU 26 therefore proceeds to step S15, and displays the other vehicle image 50A corresponding to the other vehicle 70A for which a YES determination was made at step S14 in a different color than the remaining other vehicle image 50B. For example, the other vehicle image 50B corresponding to the other vehicle 70B for which a NO determination was made at step S14 is displayed in gray, whereas the other vehicle image 50A corresponding to the other vehicle 70A for which a YES determination was made at step S14 is displayed in yellow. The color of the other vehicle image 50A corresponding to the other vehicle 70A for which a YES determination was made at step S14 is preferably a color that provides a greater visual stimulus to the driver D than the color of the other vehicle image 50B corresponding to the other vehicle 70B for which a NO determination was made at step S14.

Note that the other vehicle image 50A may continue to be displayed in yellow in cases in which the other vehicle image 50A displayed in yellow has moved to a second position, described below, while the rear end thereof is still located at a position corresponding to the first line L1. Alternatively, the other vehicle image 50A may be displayed in gray in cases in which the other vehicle image 50A that was displayed in yellow has moved to the second position while the rear end thereof is still located at a position corresponding to the first line L1.

On finishing the processing of step S15, the display control ECU 26 proceeds to step S16 and determines whether or not either of the other vehicles 70A, 70B is located at the corresponding second position based on the information received from the ADAS-ECU 36. The second position corresponds to a lane width direction position of each of the other vehicles 70A, 70B when a vehicle width direction central portion of the other vehicle 70A, 70B overlaps the corresponding lane boundary line 63A, 63B in plan view. A vehicle width direction dimension of this central portion of the other vehicle 70A, 70B has a certain length. Namely, the second position is not just one specific point.

In this example, a determination is made that the other vehicles 70A, 70B are located at the respective second positions on the lane boundary lines 63A, 63B. The display control ECU 26 therefore proceeds to step S17, and the display control section 261 displays the other vehicle images 50A, 50B overlaid on the lane boundary line images 43A, 43B as illustrated in FIG. 6.

When this is performed, the display control section 261 displays the other vehicle images 50A, 50B on the display 18 and the display region HA such that the other vehicle images 50A, 50B representing the other vehicles 70A, 70B move in a discontinuous manner from the respective first positions to the respective second positions. In the present specification and the scope of the claims, "the other vehicle images 50A, 50B move in a discontinuous manner from the respective first positions to the respective second positions" refers to the other vehicle images 50A, 50B that were displayed at positions corresponding to the respective first positions on the adjacent lane images 42A, 42B temporarily disappearing from the display 18 and the display region HA, and the other vehicle images 50A, 50B then being displayed overlaid on positions corresponding to the respective second positions on the lane boundary line images 43A, 43B.

At step S17, the display control section 261 displays the other vehicle images 50A, 50B overlaid on the corresponding adjacent lane images 42A, 42B while referencing the front-rear direction positions of the other vehicles 70A, 70B. For example, the display control section 261 displays the other vehicle images 50A, 50B overlaid on the corresponding lane boundary line images 43A, 43B such that the rear end of the other vehicle image 50A is located at a position corresponding to the first line L1, and the rear end of the other vehicle image 50B is located at a position corresponding to the third line L3.

On finishing the processing of step S17, the display control ECU 26 proceeds to step S18 and determines whether or not the other vehicles 70A, 70B are located at a third position (cut-in position) on the travel lane 61 based on the information received from the ADAS-ECU 36. The third position corresponds to a lane width direction position where the other vehicles 70A, 70B are located between the lane boundary line 63A and the lane boundary line 63B and are spaced apart from the lane boundary line 63A and the lane boundary line 63B in plan view. Namely, the third position is not just one specific point.

In this example, a determination is made that the other vehicles 70A, 70B are located at the third position on the travel lane 61, and the display control ECU 26 proceeds to step S19. As illustrated in FIG. 7, the display control section 261 displays the other vehicle images 50A, 50B overlaid on the travel lane image 41 while referencing the front-rear direction positions of the other vehicles 70A, 70B. For example, the display control section 261 displays the other vehicle images 50A, 50B overlaid on the travel lane image 41 such that the rear end of the other vehicle image 50A is located at a position corresponding to the first line L1, and the rear end of the other vehicle image 50B is located at a position corresponding to the third line L3.

When this is performed, the display control section 261 displays the other vehicle images 50A, 50B on the display 18 and the display region HA such that the other vehicle images 50A, 50B representing the other vehicles 70A, 70B move in a discontinuous manner from the respective second positions to the third position. In the present specification and the scope of the claims, "the other vehicle images 50A, 50B move in a discontinuous manner from the respective second positions to the third position" refers to the other vehicle images 50A, 50B that were displayed overlaid on positions corresponding to the respective second positions on the corresponding lane boundary lines 63A, 63B temporarily disappearing from the display 18 and the display region HA, and the other vehicle images 50A, 50B then being displayed overlaid on positions corresponding to the third position on the travel lane image 41.

On finishing the processing of step S19, the display control ECU 26 proceeds to step S20 and determines whether or not the ADAS-ECU 36 is executing tracking control (ACC or CACC) based on the information received from the ADAS-ECU 36.

In this example, a YES determination is made at step S20. The display control ECU 26 therefore proceeds to step S21, and determines whether or not either of the other vehicles 70A, 70B corresponding to the other vehicle images 50A, 50B displayed on the travel lane image 41 corresponds to a preceding vehicle from the perspective of the vehicle 10, based on the information received from the ADAS-ECU 36.

In this example, a YES determination is made at step S21. The display control ECU 26 therefore proceeds to step S22, and displays the other vehicle image 50A corresponding to the other vehicle 70A for which the YES determination was made at step S21 in a different color than the remaining other vehicle image 50B. For example, the other vehicle image 50B corresponding to the other vehicle 70B for which a NO determination was made at step S21 is displayed in gray, and the other vehicle image 50A corresponding to the other vehicle 70A for which a YES determination was made at step S21 is displayed in white. The color of the other vehicle image 50A corresponding to the other vehicle 70A for which a YES determination was made at step S21 is preferably a color that provides a greater visual stimulus to the driver D than the color of the other vehicle image 50B corresponding to the other vehicle 70B for which a NO determination was made.

In cases in which a NO determination is made at steps S10, S11, S12, S16, S18, S20, or S21, and when the processing of step S22 is ended, the display control ECU 26 ends the current round of processing in the flowchart in FIG. 8.

As described above, in cases in which the other vehicles 70A, 70B traveling along the adjacent lanes 62A, 62B are executing cut-in operations to move from the corresponding adjacent lanes 62A, 62B to cut-in positions on the travel lane 61, the display 18 and the HUD 28 perform display such that the other vehicle images 50A, 50B are moved in a discontinuous manner from the respective first positions on the adjacent lane images 42A, 42B to the respective second positions on the lane boundary line images 43A, 43B. It is therefore easy for the driver D viewing the other vehicle images 50A, 50B to identify that the other vehicles 70A, 70B traveling along the adjacent lanes 62A, 62B are executing cut-in operations. It is easier for the driver D to identify that the other vehicles 70A, 70B are executing cut-in operations than for example cases in which the other vehicle images 50A, 50B are displayed so as to move in a continuous manner from the respective first positions to the respective second positions.

Furthermore, in cases in which the other vehicles 70A, 70B are executing cut-in operations, the display 18 and the HUD 28 perform display such that the other vehicle images 50A, 50B are moved in a discontinuous manner from the respective second positions to the third position corresponding to cut-in positions on the travel lane image 41. It is therefore easy for the driver D viewing the other vehicle images 50A, 50B to identify that the other vehicles 70A, 70B traveling along the adjacent lanes 62A, 62B are executing cut-in operations. It is easier for the driver D to identify that the other vehicles 70A, 70B are executing cut-in operations than for example cases in which the other vehicle images 50A, 50B are displayed so as to move in a continuous manner from the respective second positions to the third position.

Furthermore, only the other vehicle images 50A, 50B representing the other vehicles 70A, 70B that the ADAS-ECU 36 (cut-in determination section 362) has determined might be executing (are executing) cut-in operations are displayed on the display 18 and the HUD 28. This is less likely to annoy the driver D than cases in which other vehicle images representing all the other vehicles traveling along the adjacent lanes 62A, 62B are displayed on the display 18 and the HUD 28.

Furthermore, the other vehicle images 50A, 50B representing the other vehicles 70A, 70B located on the adjacent lanes 62A, 62B are each displayed at one position from amongst plural positions corresponding to the first line L1, the second line L2, the third line L3, and the fourth line L4 that are set in a row along the front-rear direction (along the extension direction of the adjacent lane images 42A, 42B) on the adjacent lane images 42A, 42B. The driver D viewing the other vehicle images 50A, 50B is therefore able to identify the front-rear direction positions of the other vehicles 70A, 70B that might execute cut-in operations.

Furthermore, in cases in which either of the other vehicle images 50A, 50B representing the other vehicles 70A, 70B is at a position on the corresponding adjacent lane 62A, 62B corresponding to the first line L1, this other vehicle image 50A, 50B is displayed in a different format (color) than in cases in which the other vehicle image 50A, 50B is located on any line out of the second line L2 to the fourth line L4. In such cases, there is only a short front-rear direction distance between the other vehicle 70A, 70B corresponding to the other vehicle image 50A, 50B and the vehicle 10, and so sufficient attention needs to be paid to the cut-in operation by this other vehicle 70A, 70B. Since the other vehicle image 50A, 50B corresponding to this other vehicle 70A, 70B is displayed in yellow, the driver D viewing the other vehicle images 50A, 50B is able to pay sufficient attention to this cut-in operation by this other vehicle 70A, 70B.

Furthermore, in cases in which the ADAS-ECU 36 (driving assistance control section 361) has determined that either of the other vehicles 70A, 70B moving from the adjacent lanes 62A, 62B to the travel lane 61 is a preceding vehicle from the perspective of the vehicle 10 while executing tracking control, the display 18 and the HUD 28 perform display such that this other vehicle image 50A, 50B is displayed in a different format (white) than the other vehicle image 50A, 50B that is not the preceding vehicle. The driver D viewing the other vehicle images 50A, 50B is thereby able to identify whether or not either of the other vehicles 70A, 70B corresponding to the other vehicle images 50A, 50B is the preceding vehicle from the perspective of the vehicle 10.

Although a vehicular display control device, a vehicular display device, a vehicle, a vehicular display control method, and a non-transitory recording medium according to an exemplary embodiment have been described above, various design modifications may be applied as appropriate to the vehicular display control device, the vehicular display device, the vehicle, the vehicular display control method, and the non-transitory recording medium within a range not departing from the scope of the present disclosure.

For example, a configuration may be applied in which the vehicle 10 is not equipped with at least one display out of the display 18 or the display region HA.

A configuration may be applied in which only one display out of the display 18 or the display region HA displays the road image 40, the other vehicle images 50A, 50B, and the host vehicle image 55.

A configuration may be applied in which at least one display out of the display 18 or the display region HA displays the road image 40 and the other vehicle images 50A, 50B as shapes representing the road and the other vehicles when viewed in plan view.

A configuration may be applied in which the other vehicle images 50A, 50B are displayed in yellow in cases in which the other vehicles 70A, 70B have moved to the respective second positions, without displaying the other vehicle images 50A, 50B in yellow in cases in which the other vehicles 70A, 70B are located at the respective first positions.

In cases in which either of the other vehicle images 50A, 50B representing the other vehicles 70A, 70B is located at a position corresponding to the first line L1 on the corresponding adjacent lane 62A, 62B, this other vehicle image 50A, 50B may be displayed in a different color than yellow and in a different format than in cases in which the other vehicle image 50A, 50B is located at a position corresponding to any line out of the second line L2 to the fourth line L4. For example, in such cases, this other vehicle image 50A, 50B may be displayed as a flashing image.

The "specific position" in the scope of the claims may be a position corresponding to any line out of the first line L1 or the second line L2, or may be a position corresponding to any line out of the first line L1, the second line L2, or the third line L3.

The number of lines displayed on the travel lane image 41 may be a plural number other than four.

The other vehicle image 50A, 50B that is the preceding vehicle may be displayed in a different color than white and in a different format than the other vehicle image 50A, 50B that is not the preceding vehicle. For example, this other vehicle image 50A, 50B may be displayed as a flashing image.

What is claimed is:

1. A vehicular display control device, comprising a processor, wherein, in a case in which an other-vehicle traveling along an adjacent lane, which is adjacent to a travel lane of a host vehicle, is executing a cut-in operation to move from the adjacent lane to a cut-in position ahead of the host vehicle in the travel lane, the processor is configured to:
   control a display section configured to display a travel lane image representing the travel lane, an adjacent lane image representing the adjacent lane, a lane boundary line image representing a lane boundary line defining a boundary between the travel lane and the adjacent lane, and an other-vehicle image representing the other-vehicle, such that the display section causes the other-vehicle image to move in a discontinuous manner from a position on the adjacent lane image to a position on the travel lane image; and
   control the display section so as to display the other-vehicle image representing the other-vehicle located on the adjacent lane and ahead of the host vehicle at one of a plurality of positions arranged in a row along a front-rear direction on the adjacent lane image.

2. The vehicular display control device of claim 1, wherein the processor is configured to cause the display section to display the other-vehicle image in a case in which a determination is made that the other-vehicle might execute the cut-in operation based on behavior of the other-vehicle traveling along the adjacent lane.

3. The vehicular display control device of claim 1, wherein, in a case in which a determination is made that the other-vehicle moving from the adjacent lane to the travel lane is a preceding vehicle from a perspective of the host vehicle while executing tracking control, the processor is configured to control the display section such that the other-vehicle image representing the other-vehicle determined to be a preceding vehicle is displayed in a different format from the other-vehicle image in a case in which the other-vehicle has not been determined to be a preceding vehicle.

4. A vehicular display device, comprising:
   the display section; and
   the vehicular display control device of claim 1.

5. A vehicle, comprising the vehicular display device of claim 4.

6. A vehicular display control method, comprising:
   in a case in which an other-vehicle traveling along an adjacent lane, which is adjacent to a travel lane of a host vehicle, is executing a cut-in operation to move from the adjacent lane to a cut-in position ahead of the host vehicle on the travel lane, controlling a display section configured to display a travel lane image representing the travel lane, an adjacent lane image representing the adjacent lane, a lane boundary line image representing a lane boundary line defining a boundary between the travel lane and the adjacent lane, and an other-vehicle image representing the other-vehicle, such that the display section causes the other-vehicle image to move in a discontinuous manner from a position on the adjacent lane image to a position on the travel lane image, and
   controlling the display section so as to display the other-vehicle image representing the other-vehicle located on the adjacent lane and ahead of the host vehicle at one of a plurality of positions arranged in a row along a front-rear direction on the adjacent lane image.

7. A non-transitory recording medium storing a program that is executable by a computer to execute processing, the processing comprising:
   in a case in which an other-vehicle traveling along an adjacent lane, which is adjacent to a travel lane of a host vehicle, is executing a cut-in operation to move from the adjacent lane to a cut-in position ahead of the host vehicle on the travel lane, controlling a display section configured to display a travel lane image representing the travel lane, an adjacent lane image representing the adjacent lane, a lane boundary line image representing a lane boundary line defining a boundary between the travel lane and the adjacent lane, and an other-vehicle image representing the other-vehicle, such that the display section causes the other-vehicle image to move in a discontinuous manner from a position on the adjacent lane image to a position on the travel lane image, and
   controlling the display section so as to display the other-vehicle image representing the other-vehicle located on the adjacent lane and ahead of the host vehicle at one of a plurality of positions arranged in a row along a front-rear direction on the adjacent lane image.

\* \* \* \* \*